United States Patent [19]
Kobrehel

[11] Patent Number: 5,927,020
[45] Date of Patent: Jul. 27, 1999

[54] MODULAR INSERT TRIM UNIT FOR MOTOR VEHICLE DOOR

[75] Inventor: Michael D. Kobrehel, Elkhart, Ind.

[73] Assignee: Excel Industries, Inc., Elkhart, Ind.

[21] Appl. No.: 08/666,744

[22] Filed: Jun. 19, 1996

[51] Int. Cl.[6] .................................................... B60J 5/04
[52] U.S. Cl. .......................................... 49/502; 49/146.7
[58] Field of Search .............................. 49/502, 348, 349,
49/350, 351, 352; 296/146.7, 146.5

[56] References Cited

U.S. PATENT DOCUMENTS

| | | |
|---|---|---|
| 4,890,376 | 1/1990 | Boileau . |
| 4,924,630 | 5/1990 | Lomansey . |
| 4,937,977 | 7/1990 | Gergoe et al. . |
| 4,974,365 | 12/1990 | Ono . |
| 4,984,389 | 1/1991 | Benoit et al. . |
| 5,033,236 | 7/1991 | Szerdahelyi . |
| 5,035,083 | 7/1991 | Kruzich . |
| 5,048,234 | 9/1991 | Lau et al. . |
| 5,050,350 | 9/1991 | Bertolini . |
| 5,086,589 | 2/1992 | debenedetto . |
| 5,095,659 | 3/1992 | Benoit et al. . |
| 5,111,619 | 5/1992 | Billin et al. ............................... 49/502 |
| 5,111,620 | 5/1992 | Lau et al. . |
| 5,226,259 | 7/1993 | Yamagata et al. . |
| 5,251,403 | 10/1993 | Compeau et al. . |
| 5,308,129 | 5/1994 | Hlavaty . |
| 5,308,138 | 5/1994 | Hlavaty . |
| 5,345,721 | 9/1994 | Stein et al. ............................... 49/502 |
| 5,351,443 | 10/1994 | Kimura et al. . |
| 5,355,629 | 10/1994 | Kimura et al. . |
| 5,367,832 | 11/1994 | Compeau et al. . |
| 5,379,553 | 1/1995 | Kimura et al. . |
| 5,398,453 | 3/1995 | Heim et al. . |
| 5,408,785 | 4/1995 | Heim et al. . |
| 5,425,206 | 6/1995 | Compeau et al. . |
| 5,529,370 | 6/1996 | Veit ...................................... 296/146.7 |
| 5,584,144 | 12/1996 | Hisano .............................. 296/146.7 X |
| 5,603,548 | 2/1997 | Gandhi et al. ........................ 49/502 X |
| 5,626,382 | 5/1997 | Johnson et al. ...................... 296/146.7 |
| 5,762,394 | 6/1998 | Salmonowicz et al. .............. 49/502 X |

*Primary Examiner*—Jerry Redman
*Attorney, Agent, or Firm*—Banner & Witcoff, Ltd.

[57] ABSTRACT

A modular insert trim unit is provided for a motor vehicle door. The modular insert trim unit includes a one-piece molded plastic door cavity insert having a passenger-side aesthetic trim surface. The door cavity insert preferably is a hollow body structure formed by reaction injection molding and having unitary mounting bosses for structurally mounting functional door hardware and for mounting the modular insert trim unit to structural componentry of the door assembly. The modular insert trim unit preferably is preassembled as a self-supporting unit which can be inserted conveniently into a door cavity defined at least in part by an outer panel of the door assembly. Window regulator hardware, door lock and handle hardware, are thus installed into a motor vehicle door as an integrated unit with the door cavity insert, which further provides the aesthetic passenger-side trim surface generally required for motor vehicle doors. Armrests and cargo bins can be provided as unitary extensions of the hollow body door cavity insert.

21 Claims, 4 Drawing Sheets

MODULAR INSERT TRIM UNIT FOR MOTOR VEHICLE DOOR

FIELD OF THE INVENTION

The field of art to which this invention pertains is motor vehicle door design and assembly, particularly modular motor vehicle door panel design and assembly.

BACKGROUND

It has been known for many years in the design of passenger doors for motor vehicles to employ an outer panel which is structural and has an aesthetic outboard surface. Most frequently, such structural outer panels are stamped sheet steel or molded engineering plastic having a painted outboard surface. Thus, the outer panel or outer door panel provides both a decorative outer surface for the motor vehicle body and makes significant structural contribution to the vehicle door and to the vehicle body as a whole. The outer panel typically is concave to the inside of the vehicle so as to define a door cavity along with other structural door components, such as fore-and-aft end panels or the like. Motor vehicle doors also have an inner panel, that is, a structural or semi-structural panel sometimes formed of one or more flat or contoured cross-beams, such that considerable open space and/or defined openings exist approximately in the plane of the inner panel. Thus, in known designs the door cavity is defined generally between the outer panel and the inner panel. Typically, openings are provided in the inner panel for components of various functional hardware positioned in the door cavity and mounted to the inner panel.

For aesthetic reasons, a decorative trim panel formed of fiberboard, sheet plastic or the like, is mounted to the inboard side of the vehicle door, overlaying the inner panel. Such trim panels are generally non-structural, since they perform primarily a decorative purpose and serve to separate vehicle occupants from the moving parts, grease, etc. of hardware componentry within the door cavity. Certain componentry typically extends from the door cavity, through the trim panel, into the passenger compartment. Thus, the trim panel, while non-structural, must be sufficiently rigid and robust to withstand occupant contact and the like, and for mounting of various switches, cover plates, door pulls, etc. Trim panels also must have dimensional stability over the expected operating temperature range of a motor vehicle passenger compartment, and must be suitable to act as a supporting substrate surface for an overlying decorative web, for example, carpeting, vinyl sheet, fabric, etc.

Considerable design complexity and cost is associated with the manufacture and assembly of vehicle doors, especially in view of their use of an outer panel, an inner panel and a trim panel. The complexity and costly precision required of vehicle doors which are assembled of outer panels, inner panels and trim panels is reflected in the teaching of U.S. Pat. No. 5,367,832 to Compeau et al, entitled *Tubular Plastic Mounting Panel for Door Hardware*. A one-piece plastic molded member is suggested there, adapted to mount a window regulator and optionally other functional hardware. Various snap fasteners are integrally molded with the mounting panel for snap-together fastening of various door hardware, such as the window regulator, window regulator motor, door handle, and door latch control rods. Such molded plastic member is adapted to be mounted into a door cavity; a decorative trim panel would be used in the usual fashion to provide an aesthetic inboard finish. Others have taught a post-assembly coupling system for a window regulator or other vehicle door hardware to reduce assembly difficulty. In U.S. Pat. No. 4,766,697 to Boileau, for example, it is noted that assembly problems have hampered the development of modular door panel assemblies which would include window regulators preassembled to an interior trim panel. A snap-coupling is suggested, whereby certain window regulator componentry could be mounted to the outboard surface of a trim panel to reduce assembly complexity. Upon attaching the trim panel to the inner door panel, the window regulator would snap-connect to other window regulator componentry already attached to a windowpane which has been preassembled into the vehicle door cavity.

It is an object of the present invention to provide motor vehicle door components and assembly techniques having reduced complexity and/or improved performance characteristics. It is a further object of at least certain preferred embodiments to provide such door components and assembly techniques which are compatible with current motor vehicle assembly constraints, and suitable for meeting the demands of the harsh motor vehicle use environment. Additional objects will be apparent from the following disclosure of the present invention and detailed discussion of preferred embodiments.

SUMMARY

In accordance with a first aspect, a motor vehicle door modular insert trim unit is provided, comprising a one-piece molded plastic door cavity insert having a passenger-side aesthetic trim surface. Door mounting means are provided for securing the door cavity insert into a motor vehicle door cavity defined at least in part by an outer door panel. The outer door panel typically and preferably is a structural member of the motor vehicle door. Hardware mounting means also are provided in the door cavity insert for structurally mounting at least one functional hardware subassembly to the door cavity insert. At least one functional hardware subassembly is structurally mounted to the door cavity insert by the aforesaid hardware mounting means. Those skilled in the art will recognize from the present disclosure and from the following detailed description of certain preferred embodiments that the one-piece molded plastic door cavity insert can structurally mount most or all of a vehicle door's functional hardware. In addition, the aesthetic trim surface on the passenger side of the door cavity insert can be decoratively finished, as by grain or other surface texture, along with paint or body color of the plastic, etc. Some or all of the aesthetic trim surface also can serve as a supporting substrate surface for a flexible covering web, for example, carpeting, vinyl sheet, fabric, etc., along with trim or cover plates or the like for a door handle well, speaker, window crank, etc. Thus, the "three-dimensional" modular insert trim unit comprising a door cavity insert as disclosed here, in preferred embodiments, stands in place of both the trim panel and the inner door panel currently employed in traditional motor vehicle passenger door designs. Various plastic molding techniques are suitable for forming the one-piece plastic door cavity insert, including reaction injection molding (RIM) and variations thereof, such as structural reaction injection molding (SRIM) with glass fiber or other reinforcement materials. Alternative suitable molding techniques and materials will be apparent to those skilled in the art given the benefit of this disclosure.

In accordance with another aspect, a motor vehicle door assembly is provided, incorporating a modular insert trim unit as described above. The one-piece molded plastic door cavity insert of the modular insert trim unit is secured in the door cavity, which is defined at least in part by an outer door panel. At least one functional hardware system or subassembly, and preferably all functional hardware of the vehicle door, is mounted to (meaning into or onto, etc.) the door cavity insert, including, for example, the window regulator, the door lock and handle system, etc.

In accordance with yet another aspect, a method is provided for producing a motor vehicle door assembly. In accordance with such method, at least one and preferably all, of the functional hardware systems and subassemblies of a vehicle door are premounted to the one-piece molded plastic door cavity insert described above. The resulting preassembled modular insert trim unit is then inserted into a door cavity defined by an outer door panel and secured in position by suitable mounting means, with the passenger-side aesthetic trim surface of the door cavity insert partially, or most preferably completely, eliminating the need for a traditional door trim panel.

From the foregoing disclosure and the following more detailed description of various preferred embodiments, it will be apparent to those skilled in the art that the present invention provides a significant advance in the technology and art of motor vehicle door design and assembly. Particularly significant in this regard is the potential it affords for reduced cost and complexity in the design and assembly of motor vehicle doors. Functional door hardware can be preassembled to the one-piece molded plastic door cavity insert, optionally at a location remote from the vehicle assembly plant, to form a modular insert trim unit as a self-supporting installation unit. Such installation unit can be self-supporting in the sense that it is sufficiently rigid and robust, even before being secured into a door cavity, to withstand the forces and strains encountered during storage and handling associated with transport and installation and the like. The door cavity insert is "three dimensional" in the sense that it extends into the door cavity from the primary planar surface of a traditional trim panel. Thus, the door cavity insert can provide mounting surfaces substantially outboard of the plane of a traditional inner panel. This can reduce or eliminate the need for space-off brackets or tabs for mounting various hardware components to achieve proper positioning in each different application. Substantial cost and complexity reduction can be achieved by using a common hardware component (or system) for multiple different applications without unique mounting brackets for each. Optionally positioned and oriented mounting surfaces and fixtures can be molded into the three dimensional door cavity insert for each particular application. These and additional features and advantages of the present invention will be further understood from the following more detailed description of various preferred embodiments.

BRIEF DESCRIPTION OF THE DRAWINGS

Certain preferred embodiments are discussed below with reference to the appended drawings wherein.

Figure 1:
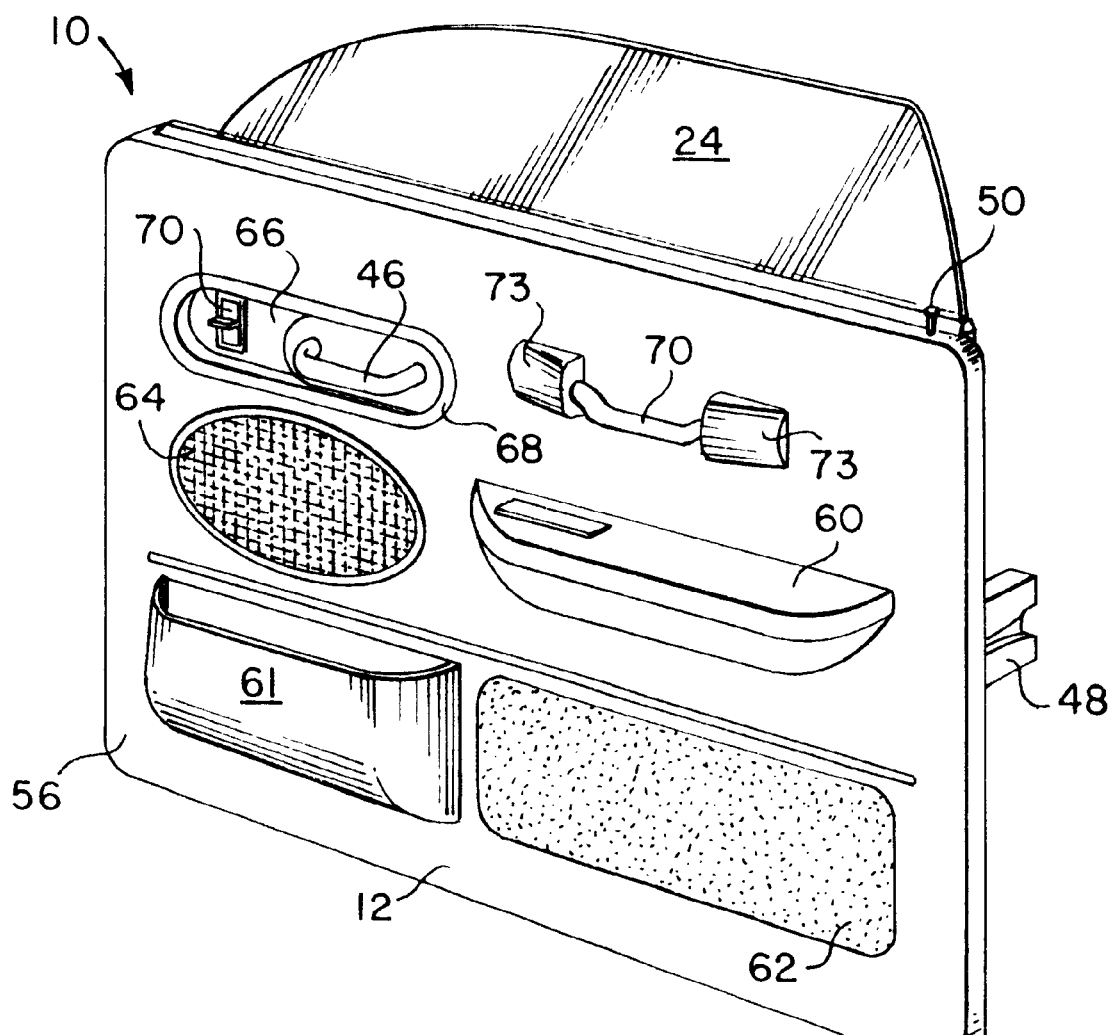
FIG. 1 is a schematic perspective view of the inboard side of a modular insert trim unit for a motor vehicle door in accordance with a preferred embodiment.

It should be understood that the appended drawings are not necessarily to scale, presenting a somewhat simplified representation of various preferred features illustrative of the basic principles of the invention. The specific design features of a modular insert trim unit as disclosed here, including, for example, specific dimensions and configurations of the door cavity insert and selection of the functional and other hardware mounted thereto, will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the modular insert trim unit illustrated in the drawings. In general, outward refers to a direction toward the outboard side of the vehicle (for example, into the plane of the paper in FIG. 1, and to the left in the plane of the paper in FIG. 3). Similarly, inward generally refers to a direction from the outboard side toward the passenger compartment of the vehicle (for example, toward the right in the plane of the paper in FIG. 3). The forward direction is generally toward the front of the vehicle (for example, to the left in FIG. 1), and rearward is toward the rear of the vehicle. A "lateral" direction is in a substantially horizontal plane perpendicular to the fore-and-aft direction of the vehicle (for example, from the inboard side of the vehicle door toward the outboard side, that is, right-to-left or left-to-right in the plane of the paper in FIG. 3).

DETAILED DESCRIPTION OF CERTAIN PREFERRED EMBODIMENTS

It will be apparent to those skilled in the art, that is, to those who have knowledge or experience in this area of technology, that innumerable design variations are possible for the modular insert trim units disclosed here and, likewise, for motor vehicle doors incorporating such modular insert trim units. The following detailed discussion of various alternative and preferred features and embodiments will illustrate the general principles of the invention such that alternative embodiments suitable for other particular applications will be readily apparent to those skilled in the art.

The modular insert trim unit, as disclosed above, is at least semi-structural. That is, it is either a semi-structural component of the motor vehicle door in which it is mounted, or it is even a structural component thereof. As used here, reference to a component being structural is intended to mean that it makes significant contribution to the rigidity and strength of the vehicle door and possibly even to the vehicle body as a whole. Reference to the modular insert trim unit being at least semi-structural will be understood to mean that it relies on being mounted to one or more structural components of the vehicle door, yet is sufficiently rigid and robust as to be self-supporting for purposes of pre-assembly to it of functional hardware, and handling during transport and installation. The modular insert trim unit also is at least semi-structural in the sense that it is sufficiently rigid and robust, when installed in the motor vehicle door, to withstand the forces and strains placed upon it during operation of functional hardware which is structurally mounted to the door cavity insert. Such functional hardware includes systems or subassemblies comprising one or more moving parts, such as a window regulator, door lock and handle hardware, etc. In accordance with preferred embodiments, such functional hardware is structurally mounted to the door cavity insert in that the door cavity insert provides substantially the sole mounting support for the hardware system or subassembly. Thus in the case of a window regulator structurally mounted to the door cavity insert in accordance with preferred embodiments disclosed here, for example, some guidance support may be provided to the windowpane of the vehicle door by window runners or tracks above the so-called beltline (the beltline is generally understood to be the bottom of the window opening in the vehicle door), but substantially all reaction forces generated during lifting and lowering of the window by the regulator would be directly borne by the door cavity insert.

Figure 2:
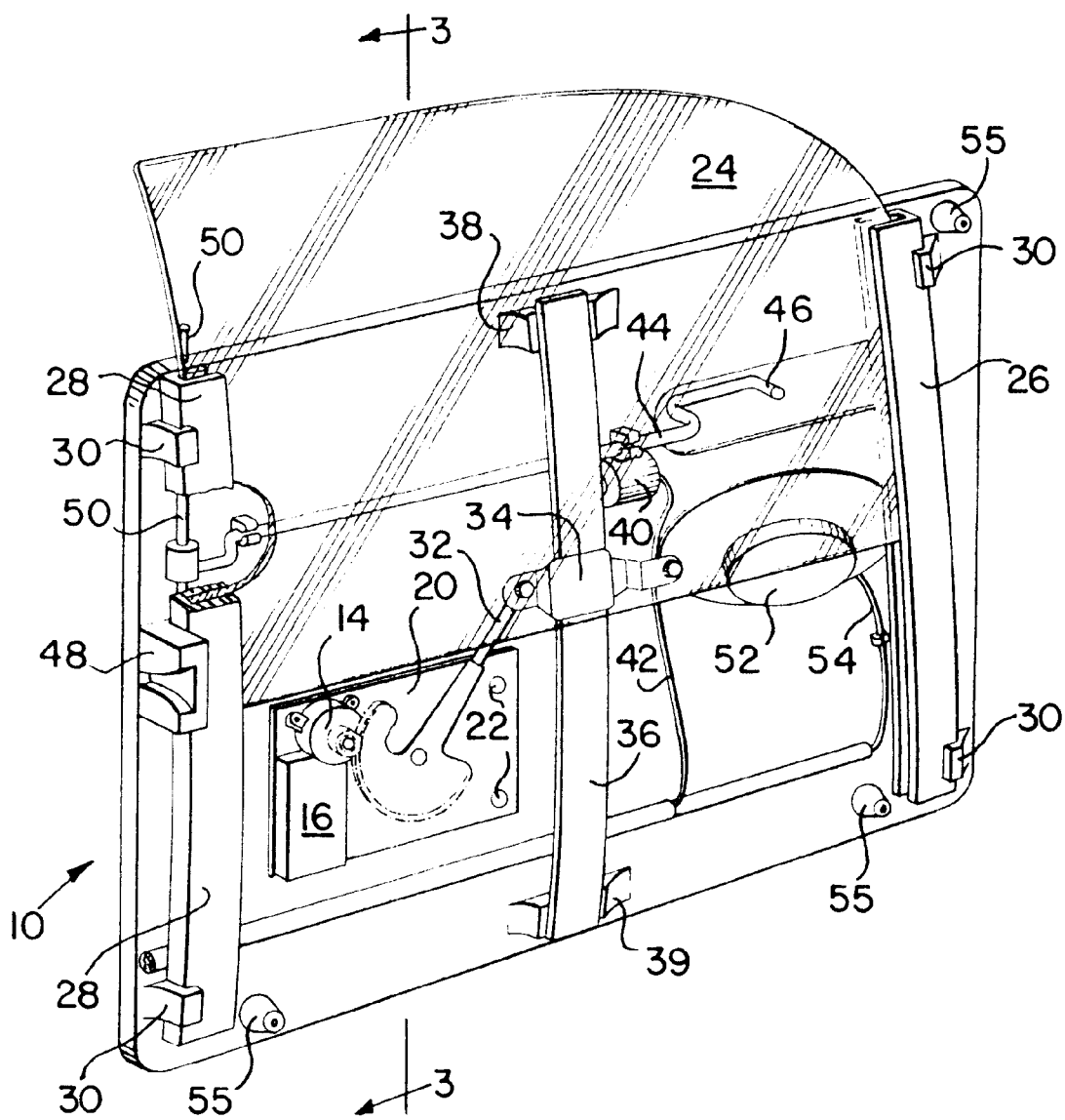
FIG. 2 is a schematic perspective view of the outboard side of the modular insert trim unit of FIG. 1.
Figure 3:
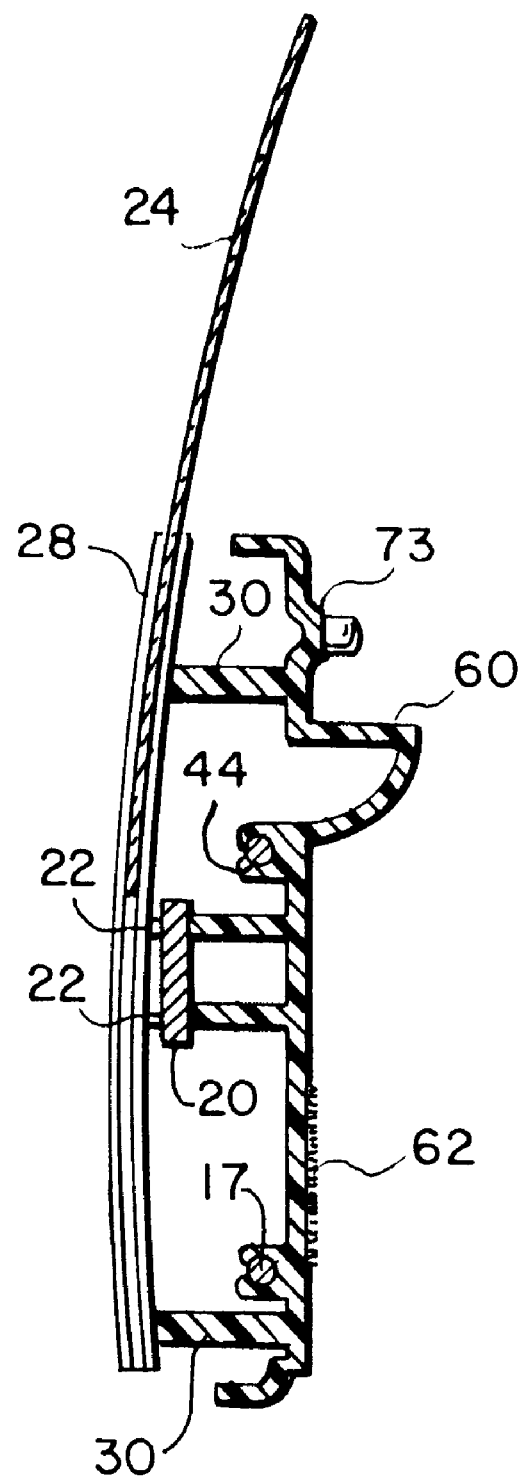
FIG. 3 is a cross-sectional view of the modular insert trim unit of FIGS. 1 and 2, taken through line 3—3 in FIG. 2, wherein certain of the hardware mounted to the door cavity insert is removed for simplicity of illustration, and the windowpane is moved toward the full up position from the substantially down position of FIGS. 1 and 2.

Significant advantage is achieved in accordance with preferred embodiments by the integration of separate parts, resulting in a lower overall number of parts requiring individual assembly, with consequent reduction in assembly time, cost and complexity. Most notably, modular door assembly can be achieved involving these and other significant advantages. A modular insert trim unit for a motor vehicle door in accordance with a preferred embodiment is illustrated in FIGS. 1 and 2. A motor vehicle door assembly incorporating such modular insert trim unit (with the windowpane raised and certain hardware removed for clarity of illustration) is illustrated in FIG. 3 in cross-sectional view. The modular insert trim unit 10 is seen to have a one-piece molded plastic door cavity insert 12 to which various functional and other hardware is mounted. In particular, as best seen in FIG. 2, a tube and shoe type window regulator 14, including electric drive motor 16, is mounted to the outboard face 18 of the door cavity insert 12. Electric motor 16 is seen to be in electrical connection with wiring bus 17 which is secured to the outboard surface 18 of the door cavity insert 12. Regulator 14 is structurally mounted via mounting plate 20 secured by means of hardware mounting means, including rigid fasteners 22 embedded in the plastic material of the door cavity insert. Regulator 14 controls the vertical travel of windowpane 24 within forward and rearward glass run channels 26, 28 structurally mounted to unitary mounting bosses 30 of the door cavity insert. Thus, substantially all of the reaction forces generated during operation of the window regulator are borne by the door cavity insert. The regulator is seen to comprise a lifting arm/sector gear 32 extending to typical windowpane attachment bracketry 34 adapted to travel vertically along guide track 36 secured by suitable bracketry 38, 39 to the outboard face of door cavity insert 12. Additional functional hardware is seen to be structurally mounted to the door cavity insert. Specifically, a door handle and power lock system is seen to comprise a solenoid 40 connected via wiring 42 to the wiring bus 17. Inside panel rod 44 leads to door handle 46 forward in the vehicle door. The door handle and power lock system further includes door latch 48 and lock rod 50 operatively connected to solenoid 40. A sound system speaker 52 is mounted to the door cavity insert and electrically connected via wiring 54 to the wiring bus 17.

Door mounting means 55 are provided for securing the door cavity insert into a motor vehicle door cavity 59. As discussed above, such door cavity is defined at least in part by an outer panel of the vehicle door, preferably being an outside structural member of the door, such as stamped steel door panel 58 seen in FIG. 3. Optionally, pin-type or socket-type fasteners, threaded or smooth, may be partially or entirely embedded into the mounting bosses for such door mounting means. Numerous suitable alternative door mounting means will be readily apparent to those skilled in the art given the benefit of the present disclosure. A cargo bin 61 is provided as a unitary formation extending inwardly from the aesthetic trim surface 56 of the door cavity insert 12.

The inboard or passenger-side of the door cavity insert is an aesthetic trim surface 56 which is seen to form an armrest 60 as a unitary projection of the passenger-side aesthetic trim surface. The aesthetic trim surface can be smooth or textured, with suitable coloring provided either by paint, body color of the molded plastic, etc. In addition, at least a portion of the aesthetic trim surface optionally forms a supporting substrate surface for an overlying flexible web 62, for example, carpeting, vinyl sheet, cloth fabric or the like. A speaker recess 64 is formed in the aesthetic trim surface 56, optionally receiving a cover or trim plate (not shown). Similarly, door handle recess 66 is formed in the aesthetic trim surface, with a protective cover plate 68 seated in the recess. Also, lock lever 70 is mounted in the handle recess 66 adjacent door handle 46. A pull strap 72 is secured to the door cavity insert by means of mounting members 72, 73.

Referring now specifically to FIG. 3, it can be seen that in the preferred embodiment illustrated in the drawings, the door cavity insert 12 is formed as a unitary molded plastic structure with unitary mounting means for various functional componentry. It sits within a door cavity 59 defined in part by outer panel 58 and in part by bottom door panel 74. Preferably, door cavity insert 12 is formed of reaction injection molded polyurethane, most preferably comprising reinforcement material such as glass fiber in the form of glass mat, random fibers, chopped strand or the like. Structural reaction injection molded polyurethane is advantageously found to be well adapted to producing door cavity inserts in accordance with the present disclosure, with a wall thickness in most areas from about 2 to 6 mm, and a flexural modulus greater than 200,000 psi. Such reaction injection molding materials and techniques are found to be highly advantageous in producing door cavity inserts disclosed here, in view of the exceptional mold filling capabilities which can be achieved. With the benefit of the present disclosure, the use of slides, core pulling, insert molding and other known techniques suitable for RIM molding will be apparent to those skilled in the art for producing door cavity inserts in accordance with the principles disclosed here. Suitable alternative manufacturing techniques and materials will be readily apparent to those skilled in the art given the benefit of the present disclosure.

Modular insert trim units and motor vehicle door assemblies are produced in accordance with method aspects of the present invention. Such methods comprise the step of providing a one-piece molded plastic door cavity insert in accordance with the principles described above. The modular insert trim unit is preassembled optionally at a place and time remote from the assembly of the motor vehicle door. It can be transported as a preassembled, self-supporting unit to a vehicle assembly plant or other facility at which the motor vehicle door is to be assembled. The modular insert trim unit is then inserted into a door cavity defined at least in part by an outer panel of the vehicle door. Once installed into the door cavity, the modular insert trim unit is secured in place to suitable structural componentry of the door by door mounting means integral, and preferably unitary with the insert trim unit assembly. It will be readily apparent to those skilled in the art that substantial advantage can be achieved in accordance with preferred embodiments through reduced vehicle door assembly cost and complexity. In addition, vehicle door repair can be similarly improved.

Figure 4:
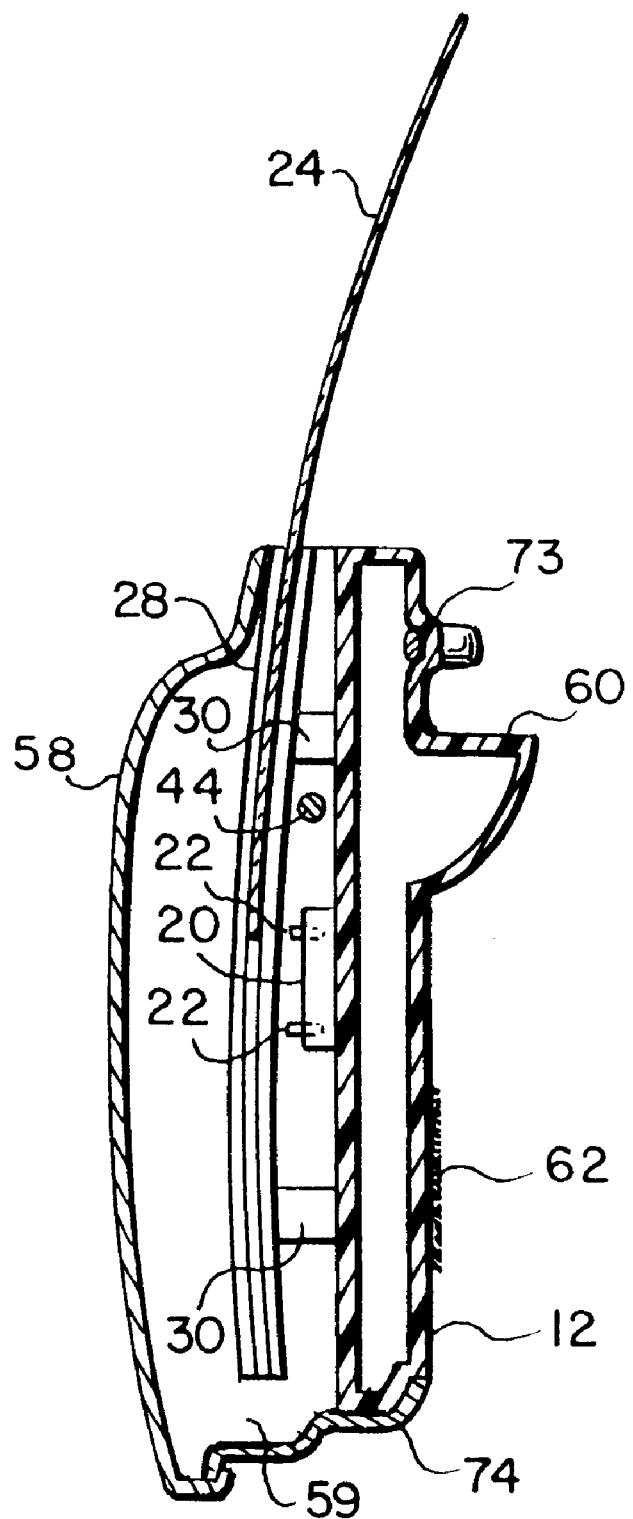
FIG. 4 is a cross-sectional view of a modular insert trim unit according to an alternative preferred embodiment, corresponding to the view of FIG. 3.

An alternative preferred embodiment is illustrated in FIG. 4 of a door cavity insert installed within a door cavity of a motor vehicle passenger door. Reference numerals employed in FIG. 4 correspond to those employed in FIG. 3 for corresponding componentry. In the embodiment of FIG. 4 the door cavity insert is a hollow-body structure having an overlying flexible web 62 on a portion of the inward facing aesthetic trim surface, along with unitary arm rest 60. The outboard wall of the hollow body forms unitary mounting members and the like as described above in connection with the embodiment of FIG. 3. It will be well within the ability of those skilled in the art, given the benefit of this disclosure, to employ known techniques for the manufacture of the hollow-body door inserts with the embodiment of FIG. 4. Such techniques include, for example, rotary molding, blow molding, gas assist injection molding, and combinations of these techniques. Materials for forming the hollow-body door cavity insert will depend in part upon the manufacturing technique selected. In general, the various engineering plastics are suitable, including, for example, nylon, polycarbonate, polypropylene and/or polyvinylchloride.

From the foregoing disclosure and detailed description of certain preferred embodiments, it will be apparent that various modifications, additions and other alternative embodiments are possible without departing from the true scope and spirit of the invention. The preferred embodiments described above are intended to be illustrative, such that the following claims are directed to the true and full scope and spirit of the invention.

I claim:

1. A motor vehicle door modular insert trim unit comprising, in combination:

a structural, molded plastic door cavity insert formed as a single unit having a passenger-side aesthetic trim surface and comprising
      door mounting means for securing the door cavity insert into a motor vehicle door cavity defined at least in part by an outer panel of a motor vehicle door, and
      at least one mounting boss extending from a side of the door cavity insert opposite the aesthetic trim surface and formed as a single piece with the door cavity insert; and
   at least one functional hardware subassembly having moving parts and structurally mounted to the door cavity insert at the mounting boss.

2. The motor vehicle door modular insert trim unit in accordance with claim 1 further comprising a flexible covering web on at least a portion of the aesthetic trim surface.

3. The motor vehicle door modular insert trim unit in accordance with claim 2 wherein the covering web comprises material selected from the group consisting of cloth, carpet, and vinyl sheet.

4. The motor vehicle door modular insert trim unit in accordance with claim 1 wherein the molded plastic door cavity insert is formed of reaction injected molded polyurethane.

5. The motor vehicle door modular insert trim unit in accordance with claim 4 wherein the reaction injection molded polyurethane comprises fiber reinforcement material.

6. The motor vehicle door modular insert trim unit in accordance with claim 5 wherein the fiber reinforcement material consists essentially of glass fiber.

7. The motor vehicle door modular insert trim unit in accordance with claim 5 wherein the reaction injection molded polyurethane has a flexural modulus greater than 200,000 psi.

8. The motor vehicle door modular insert trim unit in accordance with claim 1 wherein the molded plastic door cavity insert is at least in part hollow, having a wall thickness of 2 to 6 mm.

9. The motor vehicle door modular insert trim unit in accordance with claim 1 further comprising fasteners at least partially embedded in the structural molded plastic door cavity insert.

10. The motor vehicle door modular insert trim unit in accordance with claim 1 further comprising an armrest formed as a single unit with the passenger-side aesthetic trim surface of the molded plastic door cavity insert.

11. The motor vehicle door modular insert trim unit in accordance with claim 10 wherein at least one functional hardware subassembly is a window regulator.

12. The motor vehicle door modular insert trim unit in accordance with claim 11 further comprising a door lock subassembly structurally mounted to the door cavity insert.

13. The motor vehicle door modular insert trim unit in accordance with claim 1 wherein at least one functional hardware subassembly structurally mounted to the door cavity insert has a component extending through the aesthetic trim surface.

14. A motor vehicle door assembly having an outboard side and a passenger compartment side, comprising, in combination:

an outer panel defining at least in part a door cavity open to the passenger compartment side;
   a structural, molded plastic door cavity insert formed as a single unit mounted in the door cavity and having an aesthetic trim surface on the passenger compartment side;
   mounting bosses extending from a side of the door cavity insert opposite the passenger compartment side and formed as a single piece with the door cavity insert; and
   at least one functional hardware subassembly having moving parts and received by the door cavity insert at the mounting bosses.

15. The motor vehicle door assembly in accordance with claim 14 further comprising a covering web on at least a portion of the aesthetic trim surface.

16. The motor vehicle door assembly in accordance with claim 15 wherein the covering web comprises material selected from the group consisting of cloth, carpet, and vinyl sheet.

17. The motor vehicle door assembly in accordance with claim 14 wherein the passenger-side aesthetic trim surface of the molded plastic door cavity insert forms an armrest as a single unit with the passenger-side aesthetic trim surface.

18. The motor vehicle door assembly in accordance with claim 14 further comprising a slidably mounted windowpane, wherein the functional hardware subassembly is a window regulator for controlling movement of the windowpane, the windowpane being substantially vertically slidable in a travel plane to a down position in the door cavity, the door cavity insert extending laterally outward from the aesthetic trim surface approximately to the travel plane of the windowpane.

19. The motor vehicle door assembly in accordance with claim 14 wherein the molded plastic door cavity insert is a hollow-body plastic molding formed as a single unit.

20. A modular motor vehicle door insert comprising, in combination:

a plastic structural trim module formed as a single unit and mounted in a motor vehicle door cavity defined at least in part by an outer panel of a motor vehicle door, the plastic structural trim module having an aesthetic trim surface on a passenger compartment side, and mounting bosses formed as a single unit with the trim module, and extending from an outboard side of the trim module opposite the passenger compartment side;

means for securing the plastic structural trim module into the motor vehicle door cavity; and at least one functional hardware subassembly comprising at least in part glass run channels, wherein the mounting bosses receive corresponding glass run channels on the outboard side of the structural trim module.

21. The modular motor vehicle door insert of claim 20 wherein the functional hardware subassembly has moving parts.

* * * * *